(12) United States Patent
Li et al.

(10) Patent No.: US 11,995,371 B2
(45) Date of Patent: May 28, 2024

(54) DIVIDING METHOD, DISTRIBUTION METHOD, MEDIUM, SERVER, SYSTEM

(71) Applicant: BOE TECHNOLOGY GROUP CO., LTD, Beijing (CN)

(72) Inventors: Peng Li, Beijing (CN); Wenjuan Li, Beijing (CN); Guangyu Shao, Beijing (CN); Shuyi Li, Beijing (CN); Yang Qin, Beijing (CN); Hong Wang, Beijing (CN); Yiming Lei, Beijing (CN); Wangqiang He, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 341 days.

(21) Appl. No.: 17/309,612

(22) PCT Filed: May 29, 2020

(86) PCT No.: PCT/CN2020/093395
§ 371 (c)(1),
(2) Date: Jun. 10, 2021

(87) PCT Pub. No.: WO2021/237708
PCT Pub. Date: Dec. 2, 2021

(65) Prior Publication Data
US 2022/0308821 A1 Sep. 29, 2022

(51) Int. Cl.
G06F 3/14 (2006.01)
G06T 3/4038 (2024.01)

(52) U.S. Cl.
CPC .......... *G06F 3/1446* (2013.01); *G06T 3/4038* (2013.01)

(58) Field of Classification Search
CPC .............................. G06F 3/1446; G06T 3/4038
(Continued)

(56) References Cited

U.S. PATENT DOCUMENTS

2009/0232349 A1\* 9/2009 Moses ..................... G06T 5/006
382/100
2013/0122960 A1 5/2013 Kim et al.
(Continued)

FOREIGN PATENT DOCUMENTS

CN 103606158 A 2/2014
CN 104657101 A 5/2015
(Continued)

OTHER PUBLICATIONS

Alabdulsalam et al., "Dynamic Video Wall Tile Creation Using Raspberry Pi3", 2017 IEEE 13th International Symposium on Autonomous Decentralized Systems, IEEE (Year: 2017).\*
(Continued)

*Primary Examiner* — Diane M Wills
(74) *Attorney, Agent, or Firm* — Nath, Goldberg & Meyer; Joshua B. Goldberg

(57) ABSTRACT

A video processing method applied to a splicing screen is provided, including: dividing each frame of an initial video into multiple sub-images; and forming sub-videos using all the sub-images, the initial video and each sub-video including M frames, M being an integer greater than 1, and durations of individual frames of the sub-videos being the same, wherein i-th frames of all sub-videos are spliced into an i-th frame of the initial video, and a relative position of the i-th frame of any sub-video in the i-th frame of the initial video is the same as a relative position of any other frame of the sub-video in a corresponding frame of the initial video, where i is a variable whose value is a natural number from 1 to M. A dividing task distribution method, a computer-readable storage medium, a scheduling server, an execution server and a video processing system are provided.

6 Claims, 8 Drawing Sheets

(58) Field of Classification Search
USPC ....... 345/1.1, 1.2, 1.3, 2.1, 2.2, 2.3, 3.1, 3.2, 345/3.3, 3.4
See application file for complete search history.

(56) References Cited

U.S. PATENT DOCUMENTS

| | | | | |
|---|---|---|---|---|
| 2015/0244757 | A1* | 8/2015 | Zhuang | G06F 9/5066 |
| | | | | 709/219 |
| 2016/0163018 | A1* | 6/2016 | Wang | G06F 3/1423 |
| | | | | 345/504 |
| 2018/0315355 | A1* | 11/2018 | Hu | G09G 3/34 |

FOREIGN PATENT DOCUMENTS

| | | |
|---|---|---|
| CN | 105739935 A | 7/2016 |
| CN | 107229676 A | 10/2017 |
| CN | 108093205 A | 5/2018 |
| CN | 109213464 A | 1/2019 |

OTHER PUBLICATIONS

Alex (No. last name given), PiWall configuration file, URL: http://piwall.co.uk/information/16-piwall-configuration-file (Year: 2013).*

* cited by examiner

DIVIDING METHOD, DISTRIBUTION METHOD, MEDIUM, SERVER, SYSTEM

CROSS-REFERENCE TO RELATED APPLICATION

This is a National Phase Application filed under 35 U.S.C. 371 as a national stage of PCT/CN2020/093395, filed on May 29, 2020, the content of which is hereby incorporated by reference in its entirety.

TECHNICAL FIELD

The present disclosure relates to the field of display technology, more particularly, to a video processing method, a dividing task distribution method, a computer-readable storage medium, an execution server, a scheduling server, and a video processing system.

BACKGROUND

In some occasions in which a large screen is required for display, a splicing screen is needed. The splicing screen includes a plurality of display terminals. In order to display one picture, different display terminals in the splicing screen need to display different parts of the picture.

SUMMARY

The present disclosure aims to provide a video processing method, a dividing task distribution method, a computer-readable storage medium, an execution server, a scheduling server, and a video processing system.

As a first aspect of the present disclosure, a video processing method is provided, including:

dividing each frame of an initial video into a plurality of sub-images, the initial video including M frames, where M is a positive integer greater than 1; and forming a plurality of sub-videos using all of the obtained plurality of sub-images, each sub-video including M frames, and durations of individual frames of the plurality of sub-videos being the same as each other, wherein i-th frames of all of the plurality of sub-videos are spliced into an i-th frame of the initial video, where i is a natural number greater than or equal to 1.

Optionally, the step of dividing each frame of an initial video into a plurality of sub-images includes:

receiving a division request, wherein the division request includes a division information for each frame of the initial video; and dividing each frame of the initial video according to the division request.

Optionally, the division information includes a number of the plurality of sub-images into which each frame of the initial video is divided and layout information of the plurality of sub-images into which one frame of the initial video is divided, and the step of dividing each frame of the initial video according to the division request includes:

determining a size of each sub-image according to the division information; and dividing each frame of the initial video according to the size of each sub-image and the layout information of the plurality of sub-images into which one frame of the initial video is divided.

Optionally, the step of dividing each frame of the initial video according to the size of each sub-image and the layout information of the plurality of sub-images includes:

determining coordinates of a reference point of each sub-image in the corresponding image according to the size of the sub-image and the layout information of the plurality of sub-images; and determining information of pixels belonging to each sub-image according to the coordinates of the reference point of each sub-image in the corresponding image and the size of the sub-image to obtain each sub-image.

Optionally, each frame of the initial video is a rectangular image and is divided into a×b sub-images, each sub-image is a rectangular image, and the reference point of each sub-image is a vertex at the upper left corner of the sub-image.

Optionally, after forming the plurality of sub-videos using all of the obtained plurality of sub-images, the video processing method further includes:

assigning an address to each sub-video.

Optionally, after forming the plurality of sub-videos using all of the obtained plurality of sub-images, the video processing method further includes:

determining mapping relationship between the plurality of sub-videos and display terminals that play the plurality of sub-videos.

Optionally, before the step of dividing each frame of the initial video into a plurality of sub-images, the video processing method further includes:

obtaining a dividing task address; and acquiring the initial video according to the dividing task address.

Optionally, the initial video is in a target format, and the step of acquiring the initial video according to the dividing task address includes:

acquiring a source video in the dividing task address; and performing format conversion on the source video to obtain the initial video in response to the source video in a format inconsistent with the target format.

Optionally, after forming the plurality of sub-videos using all of the obtained plurality of sub-images, the video processing method further includes:

determining a play task according to each sub-video and identification information of a plurality of display terminals in the splicing screen;

generating a task list according to the play task; and delivering the task list to the plurality of display terminals of the splicing screen.

Optionally, the step of determining a play task according to each sub-video and identification information of a plurality of display terminals in the splicing screen includes:

determining the identification information of a display terminal required by the play task;

determining a master device in the play task and a slave device in the play task according to the identification information of the display terminal required by the play task; and generating the play task according to each sub-video and the identification information of the display terminal serving as the master device, and the identification information of the display terminal serving as the slave master.

As a second aspect of the present disclosure, there is provided a dividing task distribution method, including:

generating at least one dividing task according to the received source video; and allocating, according to statuses of a plurality of servers, each dividing task to a server that meets a predetermined condition, so that the server that receives the dividing task executes the video processing method provided in the present disclosure.

Optionally, the predetermined condition is that: the number of tasks executed by the server in the plurality of servers does not exceed a predetermined number.

Optionally, between the step of generating at least one dividing task according to the received source video and the step of allocating, according to statuses of a plurality of servers, each dividing task to a server that meets a predetermined condition, the dividing task distribution method further includes:

sorting N servers in ascending order by the number of tasks executed by each server; and the step of allocating, according to statuses of a plurality of server, each dividing task to a server that meets a predetermined condition includes:

sequentially sending the generated dividing tasks to servers in the top L among the N servers, where a value of L is the same as the number of the generated dividing tasks, and L<N.

Optionally, the dividing task distribution method further includes:

storing mapping relationship between each dividing task and the server executing the dividing task.

As a third aspect of the present disclosure, there is provided a computer-readable storage medium configured to store an executable program, and when being invoked, the executable program is capable of executing one of:

the video processing method provided by the present disclosure; and the dividing task distribution method provided by the present disclosure.

As a fourth aspect of the present disclosure, there is provided an execution server including:

a first storage module storing a first executable program therein;

one or more first processors that call the first executable program to implement the video processing method; and a first I/O interface coupled between the first processor and the first storage module to implement information interaction between the first processor and the first storage module.

As a fifth aspect of the present disclosure, there is provided a scheduling server including:

a second storage module storing a second executable program therein;

one or more second processors that call the second executable program to implement the dividing task distribution method; and a second I/O interface coupled between the second processor and the second storage module to implement information interaction between the second processor and the second storage module.

As a sixth aspect of the present disclosure, there is provided a video processing system including the execution server and the scheduling server.

Optionally, the video processing system further includes a splicing screen, the splicing screen includes a plurality of display terminals configured to display the plurality of sub-videos, respectively.

BRIEF DESCRIPTION OF THE DRAWINGS

The accompanying drawings, which are used to provide a further understanding of the present disclosure and constitute a part of the specification, are used to explain the present disclosure together with the following specific embodiments, but do not constitute limitation to the present disclosure. In the accompanying drawings.

DETAILED DESCRIPTION

Specific implementations of the present disclosure will be described in detail below with reference to the accompanying drawings. It should be understood that the specific implementations described herein are only used to illustrate and explain the present disclosure, and are not used to limit the present disclosure.

Figure 1:
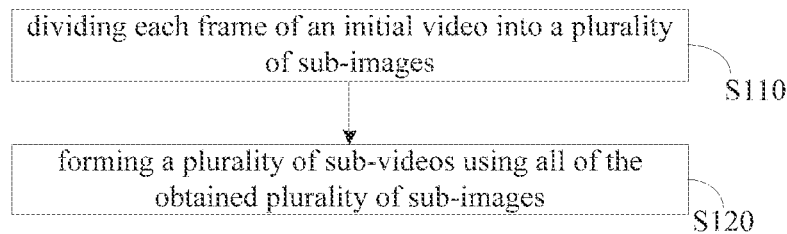
FIG. 1 is a schematic diagram of an implementation of a video processing method provided in a first aspect of the present disclosure.

As an aspect of the present disclosure, a video processing method applied to a splicing screen for display is provided. As shown in FIG. 1, the video processing method includes steps S110 and S120.

In step S110, each frame of an initial video is divided into a plurality of sub-images, and the initial video includes M frames, where M is a positive integer greater than 1.

In step S120, a plurality of sub-videos are formed using all of the obtained plurality of sub-images, each sub-video includes M frames, and individual frames of the plurality of sub-videos have a same duration, wherein i-th frames of all of the plurality of sub-videos are spliced into an i-th frame of the initial video, and for any sub-video, a relative position of the i-th frame of the sub-video in the i-th frame of the initial video is the same as a relative position of any other frame of the sub-video in the corresponding frame of the initial video, where i is a variable and is a natural number, and a value of i is from 1 to M.

Here, the value of i being from 1 to M means that the value of i is taken as 1, 2, 3, 4, 5, . . . , M in sequence.

Hereinafter, an example is given to explain what it means by the expression "for any sub-video, the relative position of the i-th frame of the sub-video in the i-th frame of the initial video is the same as the relative position of any other frame of the sub-video in the corresponding frame of the initial video".

Each frame of the initial video is a rectangular image, and each frame is divided into four sub-images in two rows and two columns. The sub-images obtained by division may be formed into four sub-videos, and for ease of description, the four sub-videos are respectively called a first sub-video, a second sub-video, a third sub-video, and a fourth sub-video. For the first sub-video: the first frame thereof is the sub-image in the first row and the first column among the four sub-images obtained by dividing the first frame of the initial video; the second frame thereof is the sub-image in the first row and the first column among the four sub-images obtained by dividing the second frame of the initial video; and so on.

The plurality of sub-videos obtained in step S120 of the present disclosure are delivered to display terminals in a splicing screen, each display terminal displays one sub-video, and thus the splicing screen displays the initial video.

In the present disclosure, the i-th frame of each sub-video is a part of the i-th frame of the initial video, and each sub-video has the same timeline as the initial video. Therefore, when using the display terminals of the splicing screen to display the sub-videos, the initial video is played visually.

The "splicing screen" here refers to a display terminal set formed by splicing a plurality of display terminals, and the plurality of display terminals in the splicing screen may be used to display one picture.

A video processing method provided by the present disclosure will be explained below in conjunction with FIG. 2a, FIG. 2b, FIG. 3a, and FIG. 3b. The initial video includes M frames.

Figures 2A, 2B:
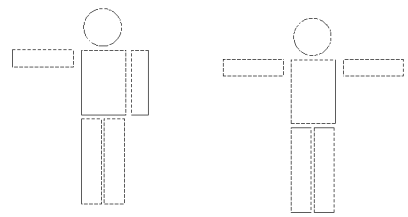
FIG. 2a is a schematic diagram showing a first frame of an initial video.
FIG. 2b is a schematic diagram showing a second frame of the initial video.

FIG. 2a shows a schematic diagram of a first frame of the initial video, and FIG. 2b shows a schematic diagram of a second frame of the initial video.

Figures 3A, 3B:
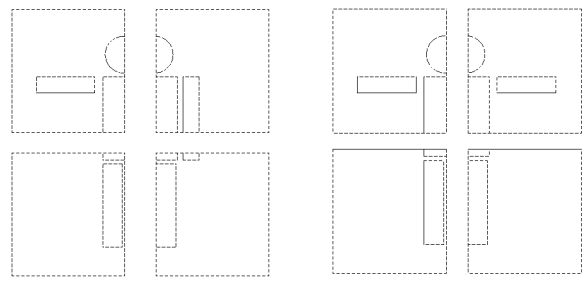
FIG. 3a is a schematic diagram showing that the first frame of the initial video is divided into four sub-images.
FIG. 3b is a schematic diagram showing that the second frame of the initial video is divided into four sub-images.

In step S110, the first frame of the initial video is divided into four sub-images as shown in FIG. 3a, and the second frame of the initial video is divided into four sub-images as shown in FIG. 3b, and the same applies to the remaining frames of the initial video until each of the M frames of the initial video is divided into four sub-images.

In step S120, four sub-videos are formed using all sub-images obtained from all the frames of the initial video. Here, timelines of the four sub-videos are the same, and are the same as the timeline of the initial video.

The so-called expression "individual frames of the plurality of sub-videos have the same duration" means that when the duration of one frame of one sub-video is t ms, the duration of one frame of any other sub-video is t ms, where t>0.

The duration of one frame of the initial video is T ms. As an optional implementation, t=T. Needless to say, the present disclosure is not limited thereto, and the specific value of t may be set according to playback requirements, as long as the durations of individual frames of all sub-videos are the same. Therefore, when all of the sub-videos are played at the same time, the respective frames of the sub-videos can be synchronized, and the initial video can be displayed by the splicing screen.

In the present disclosure, the number of the sub-videos into which the initial video is divided is not specifically limited. As an optional implementation, it may be determined according to the number of the display terminals in the splicing screen. For example, when the splicing screen includes four display terminals, the initial video is divided into four sub-videos. That is, each frame of the initial video is divided into four sub-images.

Of course, the present disclosure is not limited thereto. The video processing method provided by the present disclosure may be executed by a server in the cloud. When a user wants to use a splicing screen to display a video, a division request may be generated according to the actual condition of the splicing screen, and then the division request may be uploaded to the sever in the cloud.

The division request may include division information corresponding to a division mode (for example, the number of sub-images into which each frame of the initial video is divided, the shape of each sub-image, the size of each sub-image, etc.,) of each frame of the initial video.

Figure 4:
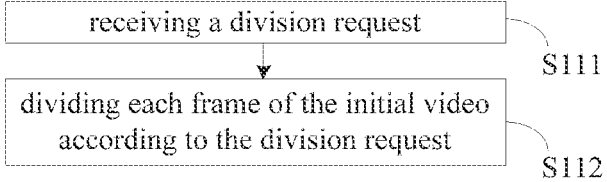
FIG. 4 is a schematic flow chart of an implementation of step S110.

Correspondingly, as shown in FIG. 4, step S110 may include steps S111 and S112.

In step S111, the division request is received, wherein the division request includes division information for each frame of the initial video.

In step S112, each frame of the initial video is divided according to the division request.

In the present disclosure, the sender of the division request in step S111 is not particularly limited. The division request may be sent (or be uploaded) by the administrator of the splicing screen via the Internet to the server that executes the video processing method.

Figure 6:
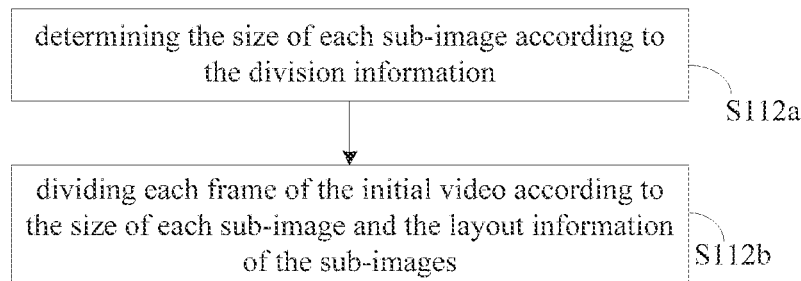
FIG. 6 is a schematic flow chart of an implementation of step S112.

As an optional implementation, the division information for each frame of the initial video in the division request may include the number of a plurality of sub-images into which each frame of the initial video is divided and layout information of the plurality of sub-images into which one frame of the initial video is divided. Correspondingly, as shown in FIG. 6, step S112 may include the following steps.

In step S112a, the size of each sub-image is determined according to the division information;

In step S112b, each frame of the initial video is divided according to the size of each sub-image and the layout information of the sub-images.

In the present disclosure, the size of each frame of the initial video is already known, and the size of each sub-image may be determined according to the number of the sub-images corresponding to each frame of the initial video.

Figure 7:
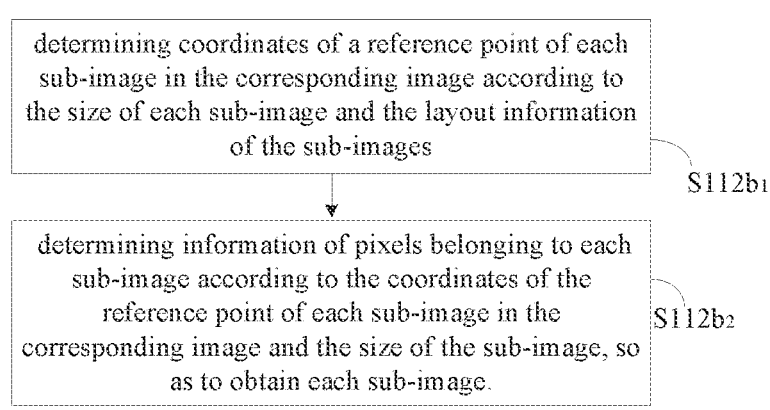
FIG. 7 is a schematic flow chart of an implementation of step S112.

In the present disclosure, how to divide each frame of the initial video according to the size of each sub-image is not particularly limited. As an optional implementation, as shown in FIG. 7, step S112b may include the following steps.

In step S112$b_1$, coordinates of a reference point of each sub-image in the corresponding image are determined according to the size of the sub-image and the layout information of the sub-images.

In step S112$b_2$, information of pixels belonging to each sub-image is determined according to the coordinates of the reference point of each sub-image in the corresponding image and the size of the sub-image, so as to obtain each sub-image.

In the present disclosure, the reference point may be a point that is displayed first when the sub-image is displayed. For example, the reference point of the sub-image may be the vertex at the upper left corner of the sub-image. By determining the coordinates of the reference point of the sub-image in the corresponding image, the information (the information may include position information of the pixels in the image and grayscale information of the pixels) of the pixels belonging to each sub-image can be determined according to the size of the sub-image. After step S113$b2$, the information of each sub-image can be output.

In the present disclosure, the shape of each frame of the sub-videos that are formed by dividing the initial video may be determined by the outline of each display terminal in the splicing screen.

Figure 9:
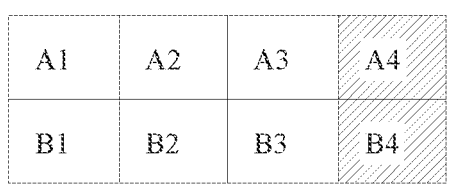
FIG. 9 is a schematic diagram showing that two different initial videos are displayed on different display terminals in a splicing screen.

In the implementation shown in FIG. 9, the splicing screen is in the shape of a rectangle and includes rectangular display terminals arranged in two rows and four columns, and thus, each sub-image may also be in the shape of a rectangle. Correspondingly, the reference point of each sub-image is the vertex at the upper left corner of the sub-image.

In the video processing method provided by the present disclosure, each frame of the initial video is a rectangular image, the number of sub-images into which each frame of the initial video is divided is a×b, each sub-image is a rectangular image, and the reference point of the sub-image is the vertex at the upper left corner of the sub-image, where a and b are both positive integers.

As an optional implementation, after uploading the division request, a user terminal may display a thumbnail of a division mode.

In order to facilitate the user terminal to generate the division request, an array may be displayed on the user terminal, and the division request may be generated by selecting the numbers of rows and columns by an operator.

Figure 5:
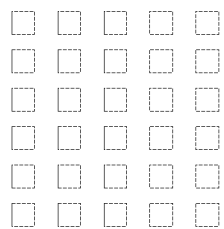
FIG. 5 is a schematic diagram of an array displayed on a user terminal.

As shown in FIG. 5, the user terminal may display an array, and the operator may select the numbers of rows and columns that each frame of the initial video needs to be divided into through a mouse, and the layout information of the sub-images may be clearly determined through the array. The layout information herein refers to relative coordinate information of a plurality of sub-images into which one image is divided, and correspondence between relative coordinate information of each sub-image in the layout and position coordinates of each sub-image in the corresponding image.

Figure 8:
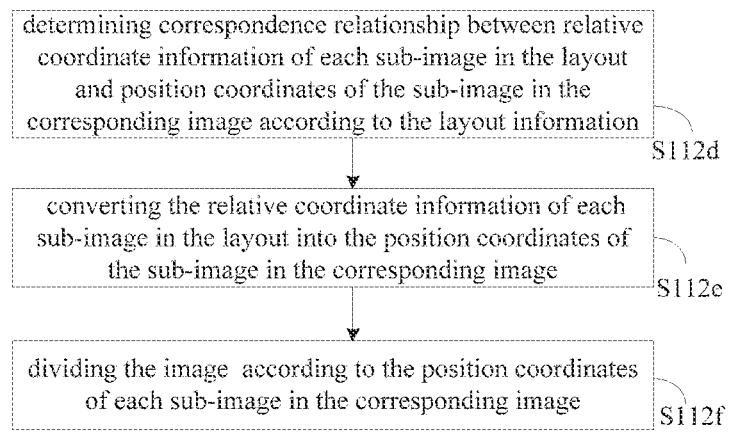
FIG. 8 is a schematic flow chart of another implementation of step S112.

Correspondingly, as shown in FIG. 8, step S112 includes the following steps.

In step S112$d$, the correspondence between the relative coordinate information of each sub-image in the layout and the position coordinates of the sub-image in the corresponding image is determined according to the layout information.

In step S112$e$, the relative coordinate information of each sub-image in the layout is converted into the position coordinates of the sub-image in the corresponding image.

In step S112$f$, the image is divided according to the position coordinates of each sub-image in the corresponding image.

For example, in the implementation shown in FIG. 9, the user terminal provides a 2×4 division request. In a 2×4 layout, A1 to A4 and B1 to B4 represent eight display terminals having a same size. Parts that are shown to be unfilled display a first initial video, which is divided into 2×3 sub-videos, and parts shown to be filled with diagonal lines display a second initial video, which is divided into 2×1 sub-videos.

When recording the layout information, each minimum unit (i.e., each sub-video) is regarded as one coordinate point, the coordinates of the sub-video corresponding to the display terminal A1 are (0, 0), and the coordinates of the sub-video corresponding to the display terminal B4 are (1, 3). One-to-one mapping between the division modes and the initial videos may be established by means of these coordinate records, and uploaded to a server that executes the video processing method. The server executes step S112$d$ to step S112$f$ after receiving the initial video and the layout information.

It should be pointed out that the "coordinates of the sub-video" here are actually the "identity identification information of the sub-video", which indicates the relative position of the sub-video in the initial video.

With the video processing method, a video can be divided for different splicing screens, and different display purposes can be achieved.

For example, the display purpose is to display a video on a splicing screen having display terminals arranged in two rows and three columns Correspondingly, information carried in the division request may include dividing the initial video into 2×3 sub-videos, with each frame of the initial video being a rectangular image.

Figure 10:
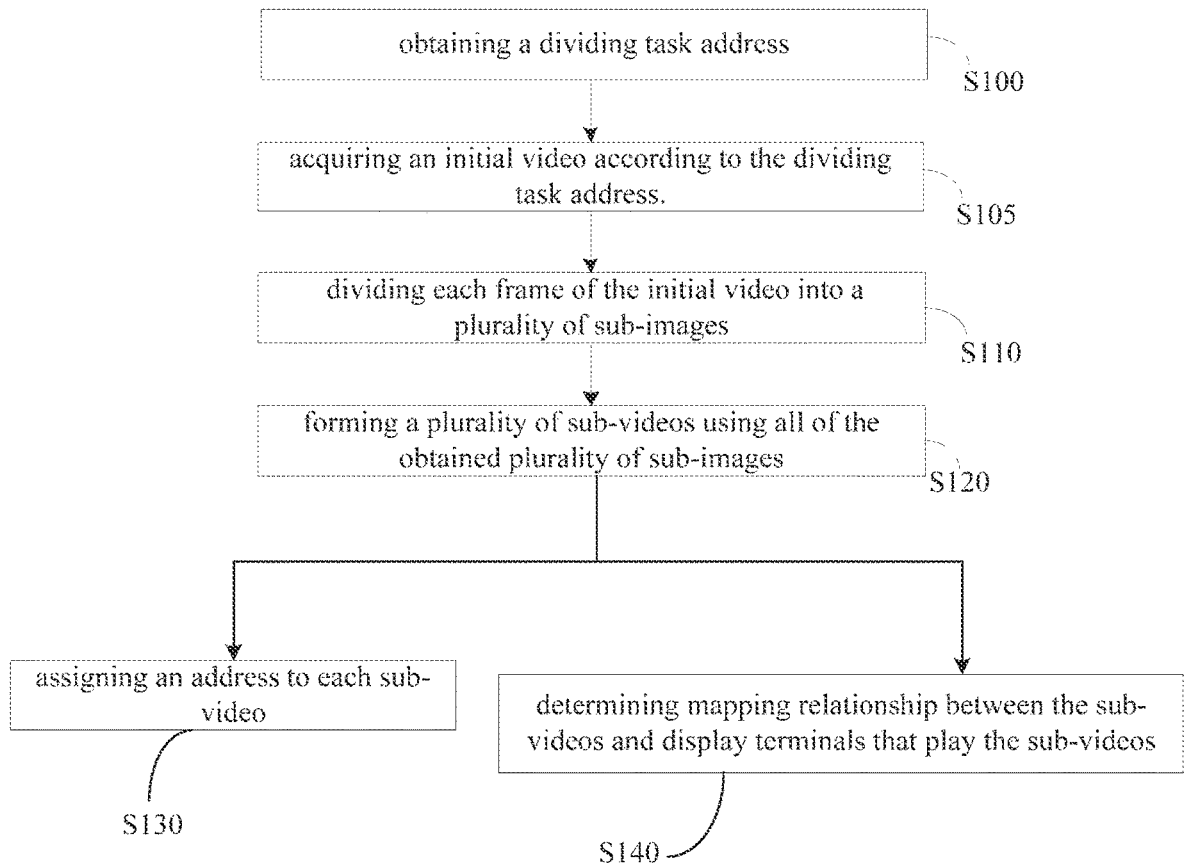
FIG. 10 is a schematic diagram showing another implementation of the video processing method provided by the present disclosure.

In the present disclosure, after the plurality of sub-videos are generated, the sub-videos need to be delivered to the display terminals of the splicing screen. In order that the splicing screen can download the corresponding sub-videos, optionally, as shown in FIG. 10, after step S120, the video processing method further includes step S130.

In step S130, an address is assigned to each sub-video.

After assigning an address for each sub-video, the splicing screen can download the corresponding sub-video according to the address of each sub-video.

In order that the splicing screen can accurately display the initial video, display terminals respectively corresponding to the sub-videos should be clear. As an optional implementation, every sub-video may be downloaded to a local storage device first, and then each sub-video may be distributed to a corresponding display terminal. As an alternative implementation, each sub-video may be directly downloaded to a corresponding display terminal.

In the present disclosure, how to determine the correspondence between the sub-videos and the display terminals is not particularly limited. For example, after downloading every sub-video to the local storage device, all sub-videos are previewed first, and then the correspondence between the sub-videos and the display terminals is determined according to the previewing result.

In order to deliver the sub-videos to the display terminals quickly, optionally, as shown in FIG. 10, after step S120, the video processing method may further include step S140.

In step S140, mapping relationship between the sub-videos and the display terminals that play the sub-videos is determined.

In the present disclosure, the sequence in which step S130 and step S140 are executed is not particularly limited. Step S130 may be executed first, and then step S140 may be executed, or step S140 may be executed first and then step S130 may be executed, or step S130 and step S140 may be executed simultaneously.

In the present disclosure, the initial video may be a video resource stored locally on the server that executes the video processing method. The division request uploaded by the user includes identification information (e.g., a video number) of the initial video to be divided. After receiving the division request, the initial video is first determined, and then step S110 is executed.

Of course, the initial video may also be a video resource stored in another location. Correspondingly, as shown in FIG. 10, before step S110, the video processing method may further include step S100 and step S105.

In step S100, a dividing task address is obtained;

In step S105, the initial video is acquired according to the dividing task address.

Figure 11:
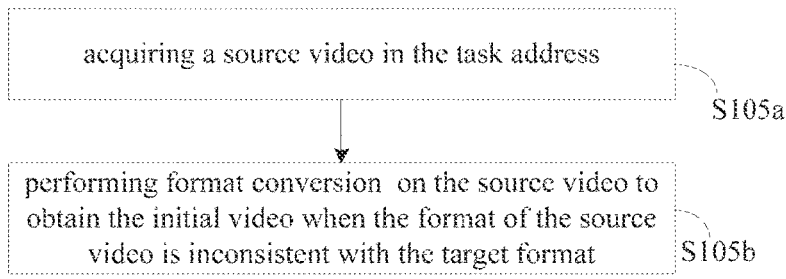
FIG. 11 is a schematic flow chart of step S105.

Different electronic devices each only support one or several formats of videos. In order to enable an electronic device to process videos of different formats, it is necessary to transcode the received video resource. Correspondingly, when the server supports division processing of the video resource in a target format, and the initial video is in the target format, as shown in FIG. 11, step S105 may include step S105a and step S105b.

In step S105a, a source video in the task address is acquired.

In step S105b, when the format of the source video is inconsistent with the target format, format conversion is performed on the source video to obtain the initial video.

Generally, video formats include mp4, avi, wmv, rmbv and other formats. When the target format is mp4 and the format of the source video is not mp4, the source video may be transcoded into mp4 format.

As an implementation of the present disclosure, after the transcoding is completed and the initial video is obtained, the initial video may be stored at the dividing task address.

Figure 12:
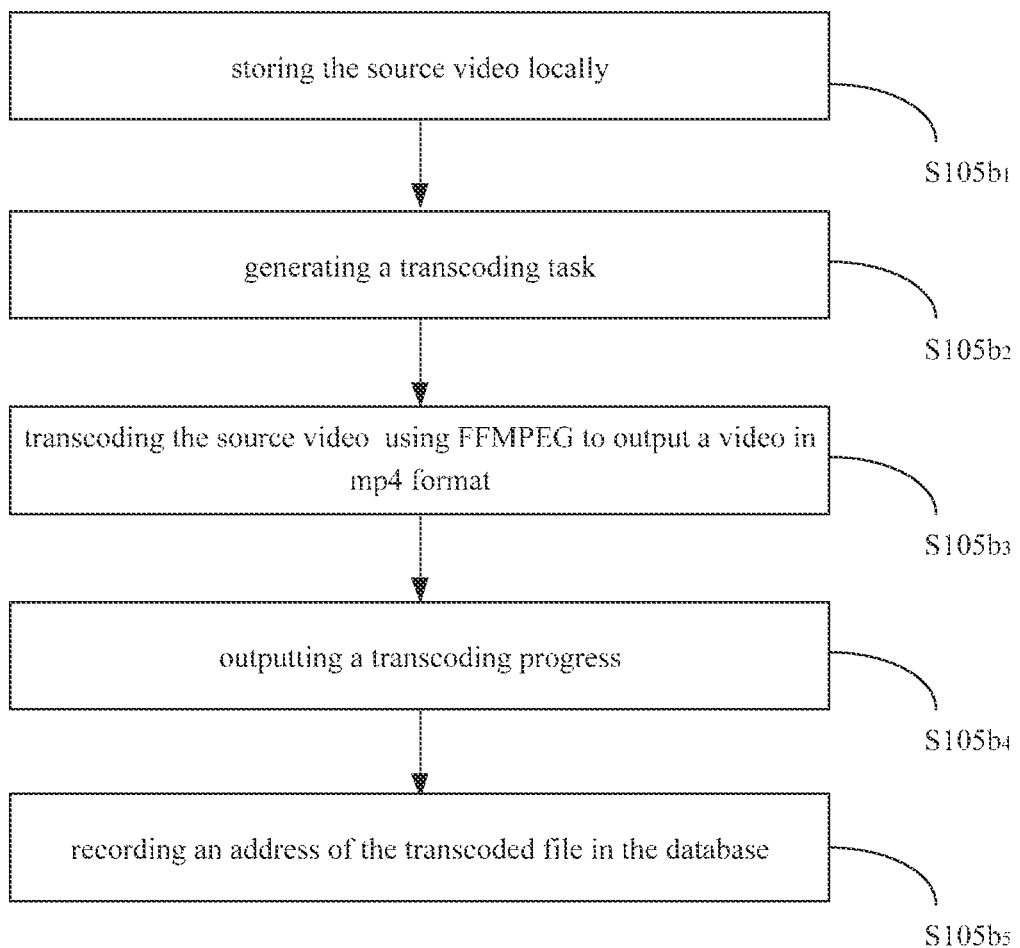
FIG. 12 is a schematic flow chart of step S105b.

Specifically, as shown in FIG. 12, step S105b may further include steps S105b1 to S105b5.

In step $S105b_1$, the source video is stored locally.

In step $S105b_2$, a transcoding task is generated.

In step $S105b_3$, the source video is transcoded using the FFMPEG program to output a video in mp4 format.

In step $S105b_4$, a transcoding progress is output.

In step $S105b5$, an address of the transcoded file is recorded in the database.

The transcoding task is completed.

As mentioned above, all sub-videos obtained by dividing the initial video need to be delivered to the display terminals of the splicing screen. In the present disclosure, there is no particular limitation on which sub-video is displayed on which display terminal in the splicing screen. As described above, the mapping relationship between the sub-videos and the display terminals may be established. The display terminal displays the sub-video corresponding thereto.

Figure 13:
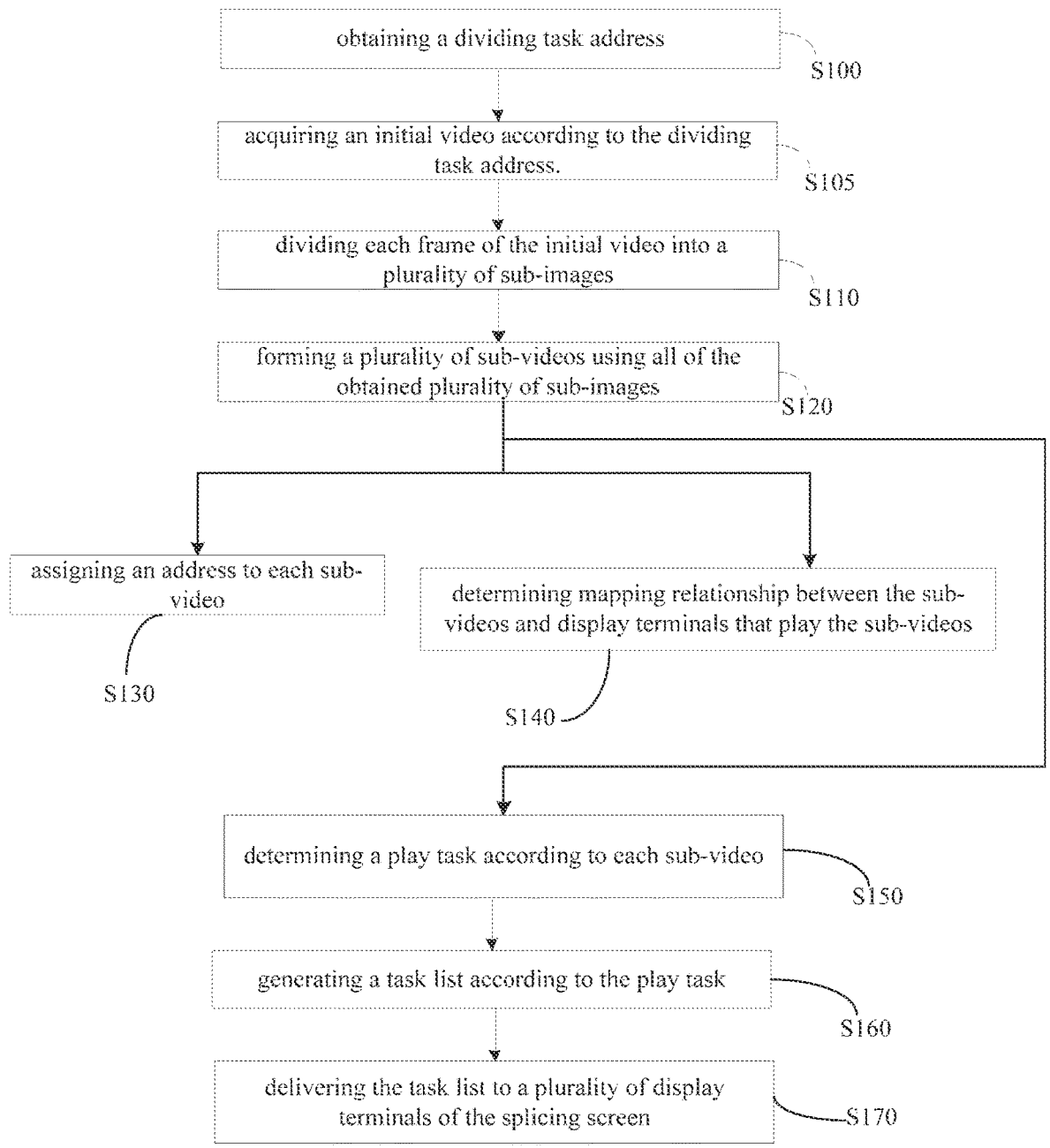
FIG. 13 is a schematic diagram showing still another implementation of the video processing method provided by the present disclosure.

Of course, the present disclosure is not limited thereto. Optionally, as shown in FIG. 13, after step S120, the video processing method may further include steps S150, S160 and S170.

In step S150, a play task is determined according to each sub-video.

In step S160, a task list is generated according to the play task.

In step S170, the task list is delivered to the plurality of display terminals of the splicing screen.

After receiving the task list, the display terminals can display the sub-videos defined in the task list according to the task list.

Figure 14:
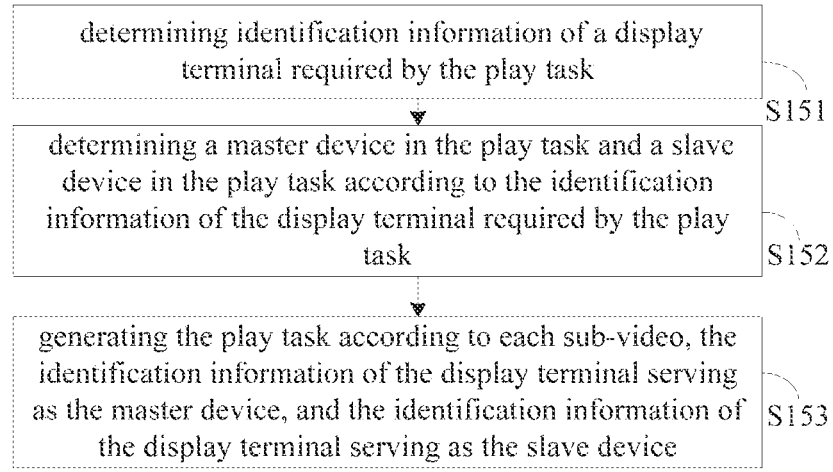
FIG. 14 is a schematic flow chart of an implementation of step S150.

Further optionally, as shown in FIG. 14, step S150 may include steps S151 to S153.

In step S151, identification information of the display terminal(s) required by the play task is determined.

In step S152, a master device in the play task and a slave device in the play task are determined according to the identification information of the display terminal(s) required by the play task.

In step S153, the play task is generated according to each sub-video, the identification information of the display terminal serving as the master device, and the identification information of the display terminal serving as the slave device.

In the present disclosure, the display terminal serving as the master device can control the display terminal serving as the slave device to display a corresponding play task.

Figure 15:
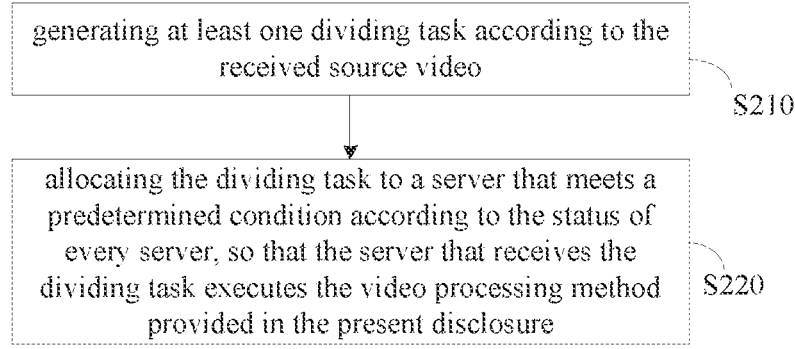
FIG. 15 is a flow chart of an implementation of a dividing task distribution method provided by the present disclosure.

As a second aspect of the present disclosure, a dividing task distribution method is provided. As shown in FIG. 15, the dividing task distribution method includes steps S210 and S220.

In step S210, at least one dividing task is generated according to the received source video.

In step S220, each dividing task is allocated to a server that meets a predetermined condition according to the status of every server, so that the server that receives the dividing task executes the video processing method provided in the present disclosure.

In the present disclosure, multiple distributed servers in the cloud can all execute the video processing method provided in the first aspect of the present disclosure. In the present disclosure, after receiving the dividing task, the status (the status includes the number of tasks that are being currently performed by the server) of every server that can execute the video processing method may be determined first.

In the present disclosure, the predetermined condition is not particularly limited. As an optional implementation, the predetermined condition is that:

the number of task(s) executed by the server in the multiple servers does not exceed a predetermined number.

The predetermined number may be determined according to the processing capacity of each server. For example, the predetermined number may be two.

Figure 16:
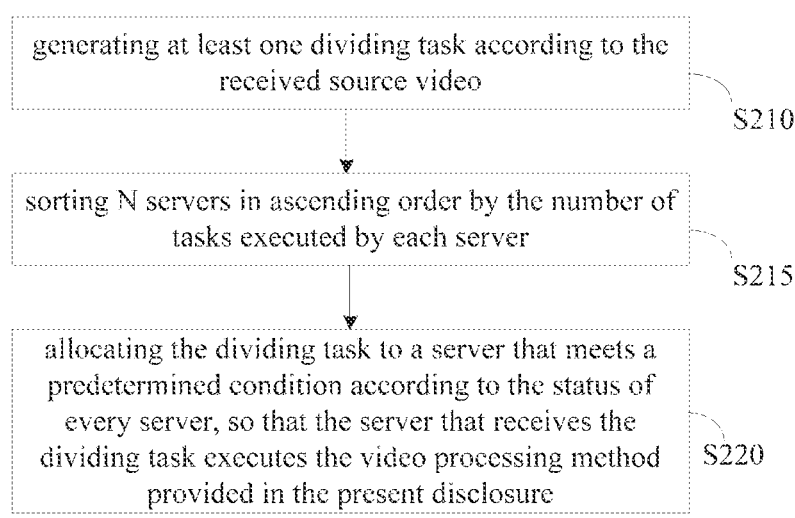
FIG. 16 is a flow chart of another implementation of the dividing task distribution method provided by the present disclosure.

Of course, the present disclosure is not limited thereto. As another optional implementation, as shown in FIG. 16, the dividing task distribution method further includes step S215 between step S210 and step S220.

In step S215, N servers are sorted in ascending order by the number of tasks executed by each server.

Correspondingly, the predetermined condition includes that the server is in the top L among the N servers, where L and N are both positive integers, and L<N.

When N>2, as an optional implementation, L may be less than N/2.

Figure 17:
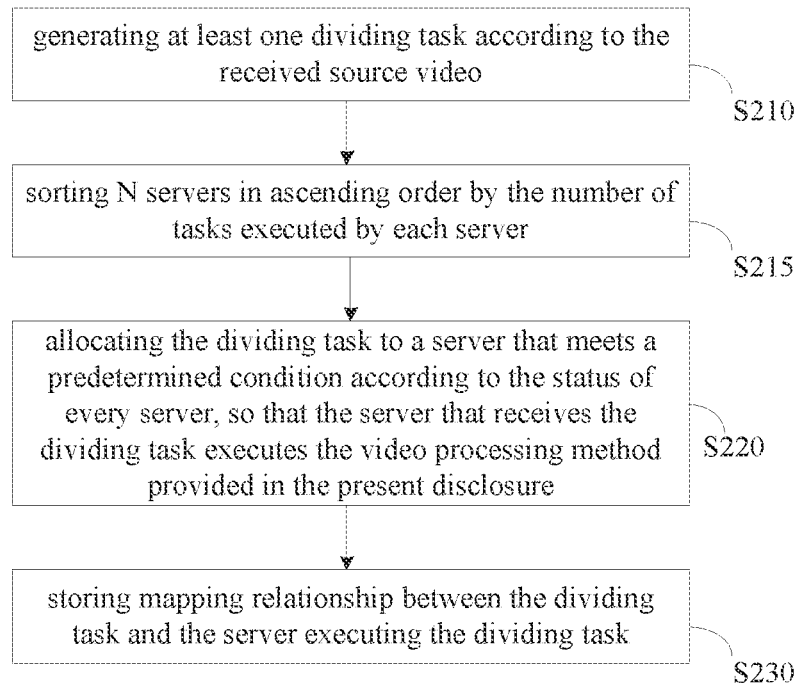
FIG. 17 is a flow chart of still another implementation of the dividing task distribution method provided by the present disclosure.

To facilitate monitoring, optionally, as shown in FIG. 17, the dividing task distribution method further includes step S230.

In step S230, mapping relationship between the dividing task and the server executing the dividing task is stored.

Figure 18:
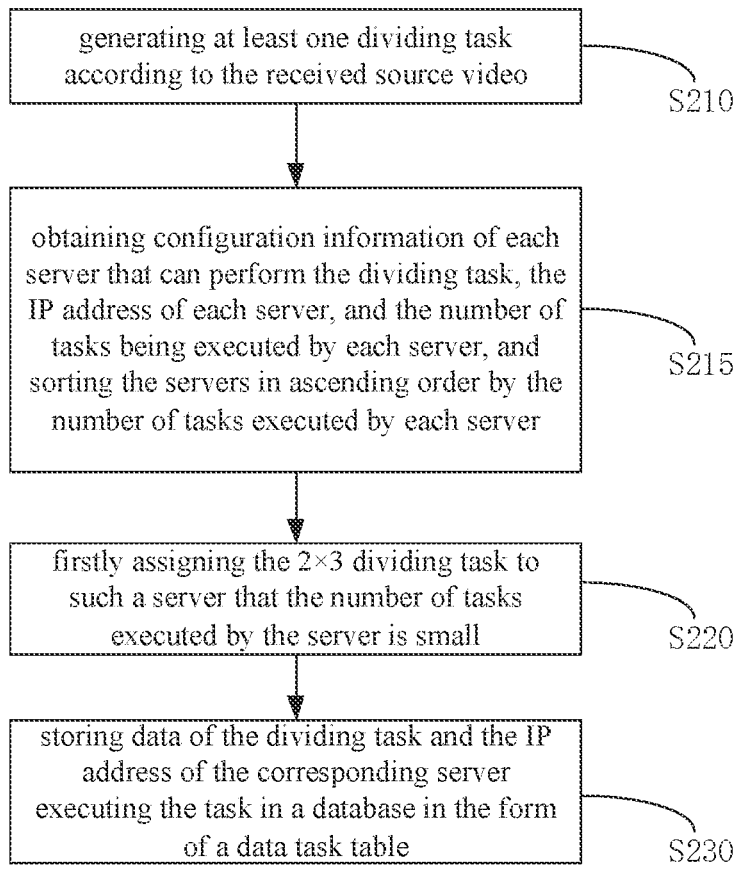
FIG. 18 is a flow chart of a specific implementation of the dividing task distribution method provided by the present disclosure.

A specific implementation of the dividing task distribution method provided by the present disclosure will be described in detail below with reference to FIG. 18.

In step S210, a dividing task is generated according to the received source video.

Step S215 is specifically executed as: obtaining the configuration information of each server that can perform the dividing task, the IP address of each server, and the number of task(s) being executed by each server, and sorting the servers in ascending order by the number of tasks executed by each server.

Step S220 is specifically executed as: firstly assigning the 2×3 dividing task to such a server that the number of tasks executed by the server is small.

Step S230 is specifically executed as: storing data of the dividing task (in the present disclosure, the task of dividing the initial video into six sub-videos may be stored as one task or multiple tasks) and the IP address of the corresponding server(s) executing the task in the database in the form of a data task table.

As a third aspect of the present disclosure, a computer-readable storage medium is provided, the computer-readable storage medium is configured to store an executable program, and the executable program can execute one of the following methods when being invoked:
 the above-mentioned video processing method provided by the present disclosure; and
 the above-mentioned dividing task distribution method provided by the present disclosure.

A person of ordinary skill in the art can understand that all or some of the steps, systems, and functional modules/units in a device in the methods disclosed above may be implemented as software, firmware, hardware, and appropriate combinations thereof. In a hardware implementation, the division between functional modules/units mentioned in the above description does not necessarily correspond to the division of physical components. For example, one physical component may have a plurality of functions, or one function or step may be performed by several physical components cooperatively. Some or all physical components may be implemented as software executed by a processor such as a central processing unit, a digital signal processor, or a microprocessor, or be implemented as hardware, or be implemented as an integrated circuit such as an application specific integrated circuit. Such software may be distributed on a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and non-removable media implemented in any method or technology for storing information (such as computer-readable instructions, data structures, program modules, or other data). The computer storage medium includes but is not limited to RAM, ROM, EEPROM, flash memory or other memory technology, CD-ROM, digital versatile disk (DVD) or other optical disk storage, magnetic cassette, magnetic tape, magnetic disk storage or other magnetic storage device, or any other medium that can be used to store desired information and be accessed by a computer. In addition, as known to those of ordinary skill in the art, communication media usually includes computer-readable instructions, data structures, program modules, or other data in a modulated data signal such as a carrier wave or other transmission mechanism, and may include any information delivery medium.

As a fourth aspect of the present disclosure, an execution server is provided, and the execution server includes:
 a first storage module, in which a first executable program is stored;
 one or more first processors that call the first executable program to implement the video processing method provided in the first aspect of the present disclosure; and
 a first I/O interface that is coupled between the first processor and the first storage module to implement information interaction between the first processor and the first storage module.

The first processor is a device capable of processing data, and includes but is not limited to a central processing unit (CPU), etc. The first storage module is a device capable of storing data, and includes but is not limited to random access memory (RAM; e.g., SDRAM, DDR, etc.), read-only memory (ROM), electrically erasable programmable read-only memory (EEPROM), or flash memory.

The first I/O interface is coupled between the first processor and the first storage module, can realize the information interaction between the first processor and the first storage module, and includes but is not limited to a data bus or the like.

In some embodiments, the first processor, the first storage module, and the first I/O interface are coupled to one another through a bus, and further coupled to other component of the display terminal.

As a fifth aspect of the present disclosure, a scheduling server is provided, and the scheduling server includes:
 a second storage module, in which a second executable program is stored;
 one or more second processors that call the second executable program to implement the dividing task distribution method provided in the present disclosure; and
 a second I/O interface that is coupled between the second processor and the second storage module to implement information interaction between the second processor and the second storage module.

The second processor is a device capable of processing data, and includes but is not limited to a central processing unit (CPU), etc. The second storage module is a device capable of storing data, and includes but is not limited to random access memory (RAM; e.g., SDRAM, DDR, etc.), read-only memory (ROM), electrically erasable programmable read-only memory (EEPROM), or flash memory.

The second I/O interface is coupled between the second processor and the second storage module, can realize the information interaction between the second processor and the second storage module, and includes but is not limited to a data bus or the like.

In some embodiments, the second processor, the second storage module, and the second I/O interface are coupled to one another through a bus, and further coupled to other component of the display terminal.

Figure 20:
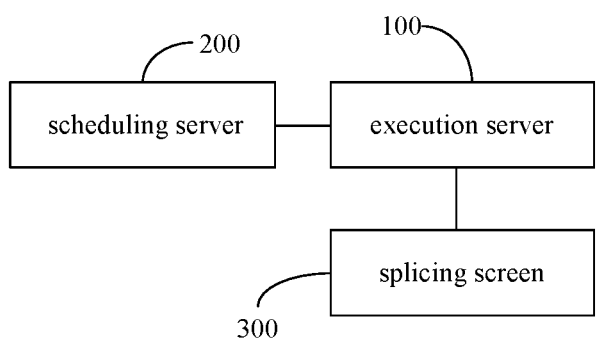
FIG. 20 is a schematic block diagram of a video processing system provided by the present disclosure.

As a sixth aspect of the present disclosure, a video processing system is provided. As shown in FIG. 20, the video processing system includes the execution server 100 and the scheduling server 200 as described above.

In the present disclosure, the execution server 100 and the scheduling server 200 may be arranged at a same location or at different locations. In order to achieve full utilization of resources, optionally, both the execution server 100 and the scheduling server 200 are cloud servers.

Figure 19:
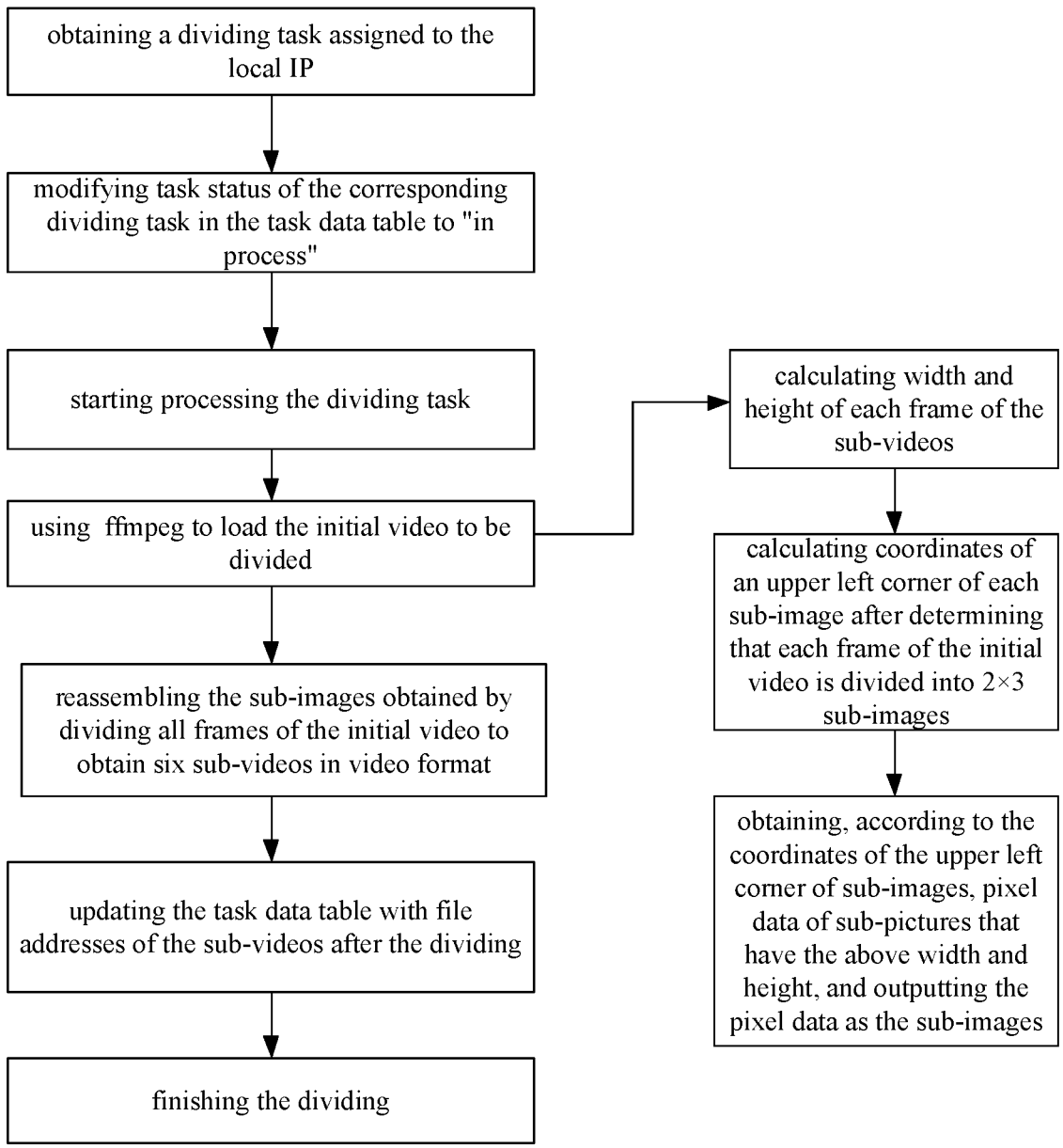
FIG. 19 is a flow chart of executing a dividing task by an execution server provided by the present disclosure.

The scheduling server 200 is used to assign a dividing task to each execution server. An implementation of a specific process that the execution server 100 executes the dividing task assigned by the scheduling server 200 will be described in detail below with reference to FIG. 19. The process includes:

querying, by the execution server, a task data table generated by the scheduling server every two seconds;

obtaining a dividing task assigned to the local IP;

modifying a task status of the corresponding dividing task in the task data table to "in process";

starting processing the dividing task;

using the ffmpeg software to load the initial video to be divided, which includes: calculating width and height of each frame of a sub-video, and calculating coordinates of an upper left corner of each sub-image after determining that each frame of the initial video is divided into 2×3 sub-images, obtaining, according to the coordinates of the upper left corner of each sub-image, pixel data of sub-images that have the above width and height, and outputting the pixel data as the sub-images;

reassembling the sub-images obtained by dividing every frame of the initial video to obtain six sub-videos in video format;

updating the task data table with file addresses of the sub-videos after the dividing; and finishing the dividing.

Optionally, the video processing system further includes a splicing screen 300, which includes a plurality of display terminals, and the plurality of display terminals are configured to display the sub-videos, respectively.

It could be understood that the above implementations are merely exemplary implementations employed for explaining the principles of the present disclosure, but the present disclosure is not limited thereto. Various modifications and improvements can be made by those of ordinary skill in the art without departing from the spirit and scope of the disclosure, and these modifications and improvements are also considered to fall within the protection scope of the present disclosure.

What is claimed is:

1. A dividing task distribution method, comprising:

generating at least one dividing task according to a received source video; and allocating, according to statuses of a plurality of servers, each dividing task to a server that meets a predetermined condition, so that the server that receives the dividing task executes a video processing method applied to a splicing screen for displays, wherein the video processing method comprises:

dividing each frame of an initial video into a plurality of sub-images, the initial video comprising M frames, where M is a positive integer greater than 1; and forming a plurality of sub-videos using all of the obtained plurality of sub-images, each sub-video comprising M frames, and durations of individual frames of the plurality of sub-videos being the same as each other, wherein i-th frames of all of the plurality of sub-videos are spliced into an i-th frame of the initial video, and for any one sub-video, a relative position of the i-th frame of the sub-video in the i-th frame of the initial video is the same as a relative position of any other frame of the sub-video in a corresponding frame of the initial video, where i is a variable, a value of which is a natural number from 1 to M, and the dividing task distribution method further comprises, between the step of generating at least one dividing task according to a received source video and the step of allocating, according to statuses of a plurality of servers, each dividing task to a server that meets a predetermined condition, a step of:

sorting N servers in ascending order by the number of tasks executed by each server; and the step of allocating, according to statuses of a plurality of servers, each dividing task to a server that meets a predetermined condition comprises:

sequentially sending the generated dividing tasks to servers in the top L among the N servers, where a value of L is the same as the number of the generated dividing tasks, and L<N.

2. The dividing task distribution method of claim 1, wherein the predetermined condition is that:

a number of tasks executed by the server in the plurality of servers does not exceed a predetermined number.

3. The dividing task distribution method of claim 1, further comprising:

storing mapping relationship between each dividing task and the server executing the dividing task.

4. A computer-readable storage medium for storing an executable program, wherein when being invoked, the executable program is capable of executing the dividing task distribution method of claim 1.

5. A scheduling server, comprising:

a second storage module storing a second executable program therein;

one or more second processors that call the second executable program to implement the dividing task distribution method of claim 1; and a second I/O interface coupled between the second processor and the second storage module to implement information interaction between the second processor and the second storage module.

6. A video processing system, comprising the scheduling server of claim 5.

* * * * *

UNITED STATES PATENT AND TRADEMARK OFFICE
CERTIFICATE OF CORRECTION

| | | |
|---|---|---|
| PATENT NO. | : 11,995,371 B2 | Page 1 of 1 |
| APPLICATION NO. | : 17/309612 | |
| DATED | : May 28, 2024 | |
| INVENTOR(S) | : Peng Li et al. | |

It is certified that error appears in the above-identified patent and that said Letters Patent is hereby corrected as shown below:

On the Title Page

Item (71) Applicant, please delete the Applicant name "BOE TECHNOLOGY GROUP CO., LTD" and replace with "BOE TECHNOLOGY GROUP CO., LTD.".

Signed and Sealed this
Second Day of July, 2024

Katherine Kelly Vidal
*Director of the United States Patent and Trademark Office*